June 6, 1961
A. J. PIEL
2,987,040
AUTOMATIC ANIMAL FEEDER
Filed Dec. 29, 1958
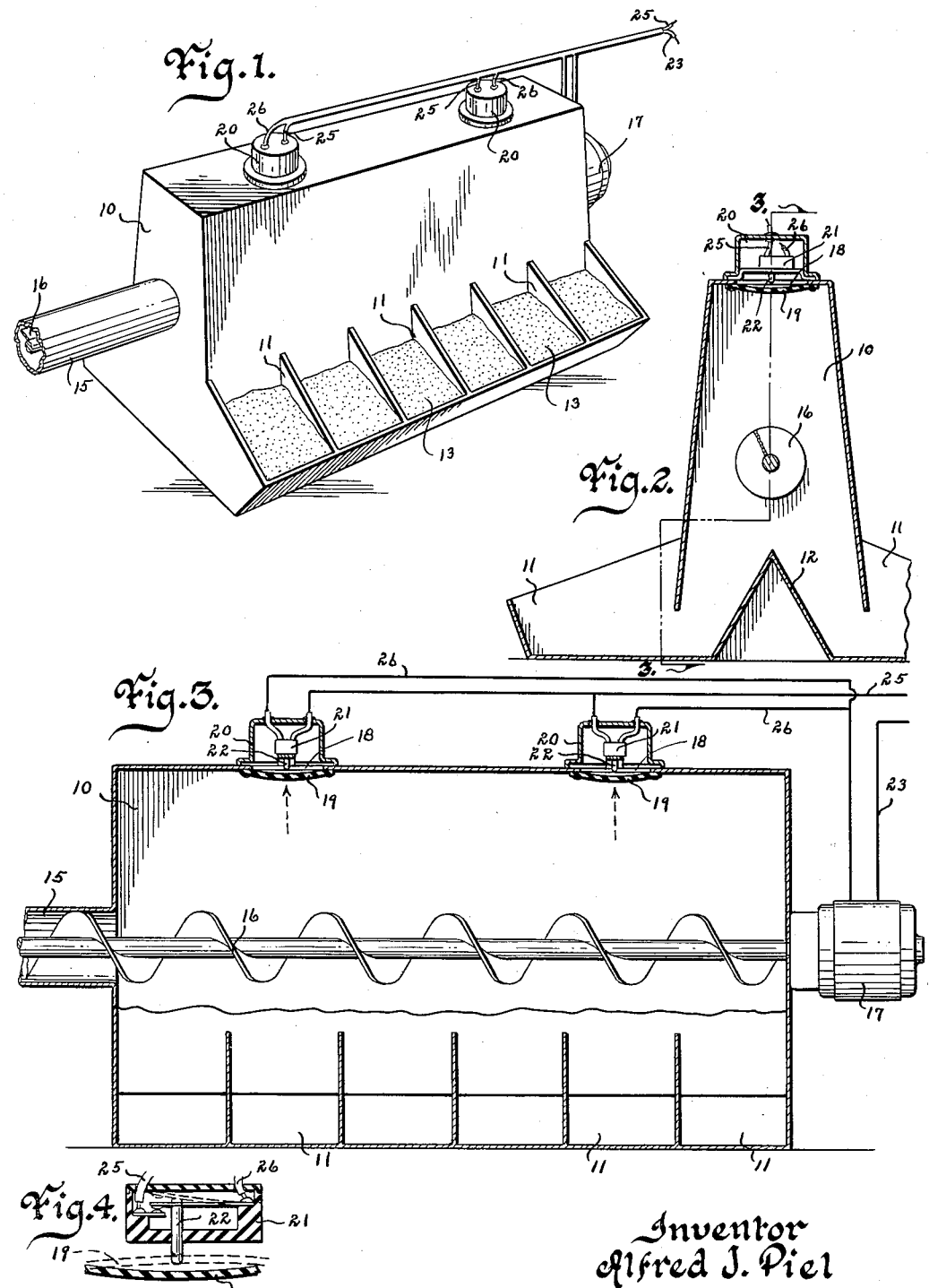
Inventor
Alfred J. Piel
by M. Talbert Dick
Attorney
Witness
Edward P. Seeley

United States Patent Office 2,987,040
Patented June 6, 1961

2,987,040
AUTOMATIC ANIMAL FEEDER
Alfred J. Piel, Hubbard, Iowa
Filed Dec. 29, 1958, Ser. No. 783,322
4 Claims. (Cl. 119—52)

This invention relates to animal feeders and more particularly to one that supplies feed automatically as it is consumed by the animals from the feed trough.

The use of animal feeders is old and they usually consist of a storage compartment having a passageway leading to a feeding trough. While such storage compartments do eliminate the task of constantly manually filling the trough section, the storage compartment must be replenished quite frequently.

Therefore one of the principal objects of my invention is to provide an automatic means for maintaining a supply of feed in the supply compartment of an animal feeder.

A further object of this invention is to provide an automatic animal feeder that shuts off its operating mechanism by a given supply of feed available in the feeder and turns on its operating mechanism when the available feed in the feeder falls below such given supply.

A still further object of this invention is to provide an all weather automatic animal feeder that requires little if any attention or servicing.

Still further objects of my invention are to provide an automatic animal feeder that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my automatic animal feeder;

FIG. 2 is an enlarged cross-sectional view of the feeder and more fully illustrates its construction;

FIG. 3 is a longitudinal sectional view of my feeder taken on line 3—3 of FIG. 2; and FIG. 4 is an enlarged cross-sectional view of one of the switch units.

My feeder is adapted to be used with and adjacent a large feed supply building (not shown) such as a granary, grain elevator building, bin or like. In some respects my feeder is similar to ones now in general usage, i.e., it has a feed supply compartment housing 10 open at its bottom to communicate with the inner end areas of the feeding trough units 11, a row of which is located at each side of the supply compartment as shown in FIG. 2. Also there is a longitudinal divider 12 between the two rows of trough units, which divides the same into the two opposed rows. This ridge divider 12 extends inwardly and upwardly from both of its sides and comes to a pointed ridge within the lower area of the supply compartment. The lower marginal side edges of the supply compartment portion extend downwardly to a horizontal plane below that of the top horizontal planes of the trough unit portions, as shown in FIG. 2. By such an arrangement the feed 13 will pass downwardly into the trough units from the supply compartment, but will not run out and over the upper marginal edges of the trough units. It is to such a structure that I provide my automatic feeding means and which I will now describe in detail. As herebefore indicated, I place the feeder adjacent a granary or like. It may have one end actually in contact with the grain building. If it is to be located a few feet away from the building I use a horizontal auger pipe 15 having one end communicating with the inside adjacent center end of the supply compartment housing 10 as shown in Fig. 3 and its other end adapted to terminate inside the grain building. The numeral 16 designates an ordinary spiral auger rotatably longitudinally horizontally mounted in the supply compartment 10 and the auger pipe 15 by any suitable means. This auger 16 extends from one end of the supply compartment to its other end. Secured to this auger for rotating the same is the drive shaft of the electric motor 17. Obviously, when this auger is rotated it will bring grain from the grain building into the feeder supply compartment 10. In the top of the supply compartment housing 10, I cut a plurality of spaced apart longitudinally arranged holes 18. Each hole is enclosed by a resilient flexible plate 19 of rubber or like material. Directly above each flexible plate 19 I secure an inverted cup housing 29 having an ordinary inverted push button electric switch 21. These switches are of the reverse type in that when their button 22 is depressed upwardly the electric circuit is broken as shown in FIG. 4. The switch button is directly above the flexible plate and is capable of being contacted and actuated by the plate when it is elevated by any applied force. While any desired number of plates and switches may be used, in the drawings I show two. The numeral 23 designates the negative lead wire having one end adapted to be in contact with the negative side of a suitable source of electrical energy, and its other end in contact with the negative connection of the electrical motor. The numeral 25 designates the positive lead wire having one end adapted to be in electrical contact with the positive side of a suitable source of electrical energy and its other end connected to one terminal of each of the switches as shown in FIG. 3. The numeral 26 designates an electric lead wire connected to the other terminal of each of the switches and to the positive connection of the motor.

The practical operation of the device is as follows: With the flexible resilient plates in normal positions as shown in FIG. 3, the electric circuit will be closed and therefore the motor will be rotating and the auger will be bringing feed into the supply compartment of the feeder. This will continue until the feed builds up in the supply compartment to a height and pressure where the flexible resilient plates are engaged and flexibly forced upwardly to actuate the push buttons of all the switches. With all the switches opened the motor will automatically stop and no more feed will be delivered into the feeder until some of it is consumed by the animals. The animals may well eat more from one end of the trough than from the other; however, regardless of this, the moment the feed drops from its pressure on any one resilient plate, its adjacent switch will automatically close, the motor will start and more feed will be delivered into the available space in the compartment 10. Any suitable conveyer means may be substituted for the auger. Also any suitable pressure actuated switch (such as the bellows type) may be substituted for the specific type shown.

From the foregoing it will be appreciated that I have provided an automatic refillable animal feeding trough.

Some changes may be made in the construction and arrangement of my automatic animal feeder without department from the real spirit and purpose of my invention, and it is my intention to cover by my claims, any modified forms of structure or use of mechanical equivalents which may be reasonably included within their scope.

I claim:

1. In an animal feeder, a supply compartment, a feeding trough portion communicating with the bottom of said supply compartment, a grain auger rotatably mounted in said supply compartment and adapted to extend into a grain storage area, a motor operatively connected to said auger, an electric circuit connected to said motor and adapted to be connected to a source of electrical energy, and a switch means opened by pressure and closed by lack of pressure imposed in said circuit and operatively communicating with the inside of said supply compartment; said switch means having an actuating lever, and a flexible plate with one side adjacent the actuating lever and its other side facing to the inside top of said supply compartment.

2. In an animal feeder, a supply compartment, a feeding trough portion communicating with the bottom of said supply compartment, a grain auger rotatably mounted in said supply compartment and adapted to extend into a grain storage area, a motor operatively connected to said auger, an electric circuit connected to said motor and adapted to be connected to a source of electrical energy, and a switch means opened by pressure and closed by lack of pressure imposed in said circuit and operatively communicating with the inside of said supply compartment; said switch means having an actuating lever, and a flexible resilient plate with one side adjacent the actuating lever and its other side facing to the inside top of said supply compartment.

3. In an animal feeder, a supply compartment, a feeding trough portion communicating with the bottom of said supply compartment, a grain conveyer means extending into said supply compartment and adapted to extend into a grain storage area, a motor operatively connected to said conveyer means, an electric circuit connected to said motor and adapted to be connected to a source of electrical energy, and a switch means opened by pressure and closed by lack of pressure imposed in said circuit and operatively communicating with the inside top of said supply compartment.

4. In an animal feeder, a supply compartment, a feeding trough portion communicating with the bottom of said supply compartment, a grain auger rotatably mounted in said supply compartment and adapted to extend into a grain storage area, a motor operatively connected to said auger, an electric circuit connected to said motor and adapted to be connected to a source of electrical energy; said supply compartment having a hole in its top, a rubber-like plate closing the hole in said supply compartment, and a switch imposed in said circuit having a circuit breaking depressible button adjacent said plate.

References Cited in the file of this patent

UNITED STATES PATENTS

| | | |
|---|---|---|
| 2,475,404 | Reed | July 5, 1949 |
| 2,646,023 | Virgil | July 21, 1953 |
| 2,785,792 | Cordis | Mar. 19, 1957 |